(12) United States Patent
Liu et al.

(10) Patent No.: US 10,303,748 B2
(45) Date of Patent: May 28, 2019

(54) METHOD AND DEVICE FOR PROVIDING WEBPAGE BROWSING BASED ON WEB BROWSER ENGINE KERNEL (71) Applicant: BEIJING QIHOO TECHNOLOGY COMPANY LIMITED, Beijing (CN)

(72) Inventors: Qingping Liu, Beijing (CN); Huan Ren, Beijing (CN)

(73) Assignee: Beijing Qihoo Technology Company Limited, Beijing (CN)

(*) Notice: Subject to any disclaimer, the term of this patent is extended or adjusted under 35 U.S.C. 154(b) by 767 days.

(21) Appl. No.: 14/399,398

(22) PCT Filed: Apr. 19, 2013

(86) PCT No.: PCT/CN2013/074446
§ 371 (c)(1),
(2) Date: Nov. 6, 2014

(87) PCT Pub. No.: WO2013/166906
PCT Pub. Date: Nov. 14, 2013

(65) Prior Publication Data
US 2015/0095760 A1    Apr. 2, 2015

(30) Foreign Application Priority Data
May 7, 2012    (CN) .......................... 2012 1 0139290

(51) Int. Cl.
G06F 17/00 (2006.01)
G06F 17/22 (2006.01)
G06F 21/53 (2013.01)

(52) U.S. Cl.
CPC .......... *G06F 17/2247* (2013.01); *G06F 21/53* (2013.01); *G06F 2221/2119* (2013.01); *G06F 2221/2149* (2013.01)

(58) Field of Classification Search
None
See application file for complete search history.

(56) References Cited

U.S. PATENT DOCUMENTS 7,020,882 B1 *  3/2006  Lewallen .............. G06F 9/4445
                                                       717/106
2009/0300111 A1 * 12/2009  Rana ................ G06F 17/30905
                                                       709/203

(Continued)

OTHER PUBLICATIONS

Lex, "Apple Engineers Annouce WebKit2", pp. 1-4, dated: Apr. 9, 2010, URL<http://www.macworld.com/article/1150517/webkit2.html.>.*

(Continued)

*Primary Examiner* — Mustafa A Amin
(74) *Attorney, Agent, or Firm* — Polsinelli PC (57) ABSTRACT The invention discloses a method and device for providing webpage browsing based on a Webkit kernel to solve the problem of poor security resulting from using the kernel control of Webbrowser. The method comprises: setting a page object exporting interface of the Webkit kernel; starting the Webkit kernel in a first independent process; invoking the page object exporting interface to create a Webkit kernel based page object in a second independent process; and invoking a Webkit kernel in the first independent process via the page object to conduct a page browsing operation and page content loading based on the Webkit kernel. The present application can well solve the problems that in a browser the version of the Webbrowser kernel lags, the security thereof is poor, and it does not support a non-Microsoft platform, as well as the problems of a high technical threshold, difficult upgrade, an oversized installation package, etc. resulting from directly using the webkit kernel.

20 Claims, 5 Drawing Sheets

(56) References Cited

U.S. PATENT DOCUMENTS

| | | | |
|---|---|---|---|
| 2010/0325085 A1* | 12/2010 | Stritzel | G06F 8/60 707/609 |
| 2011/0185271 A1 | 7/2011 | Aciicmez et al. | |
| 2011/0276908 A1* | 11/2011 | O'Riordan | G06F 9/451 715/763 |
| 2011/0314389 A1* | 12/2011 | Meredith | G06F 8/60 715/751 |
| 2012/0311436 A1* | 12/2012 | Steele | G06F 17/212 715/246 |
| 2013/0120368 A1* | 5/2013 | Miller | G06T 15/00 345/419 |
| 2014/0095575 A1* | 4/2014 | Lu | G06F 17/30873 709/201 |

OTHER PUBLICATIONS

Garsiel et al., "How Browsers Work: Behind the scenes of modern web browsers", pp. 1-52, dated Aug. 5, 2011, URL<https://www.html5rocks.com/en/tutorials/internals/howbrowserswork/#HTML_Parser>.*

Irish et al., "How Browsers Work:Behind the scenes of modern web browsers", published 2011, NPL, pp. 1-44 <https://www.html5rocks.com/en/tutorials/internals/howbrowserswork/> (Year: 2011).*

International Search Report regarding Chinese International Application No. PCT/CN2013/074446 dated Jul. 25, 2013, 3 pages.

English translation of abstract only of Chinese application CN102314510 A, Title: Method and system for executing browser control, Publication dated Jan. 11, 2012, Country: CN, Inventors: Zhi Chen; Jinwei Li; Peng Sun, one page.

English translation of abstract only of Chinese application CN102163161 A, Title: Process management method and device thereof, Publication dated Aug. 24, 2011, Country: CN, Inventors: Weikai Yang, one page.

English translation of abstract only of Chinese application CN102314516 A, Title: Webpage processing method and mobile terminal and electronic device thereof, Publication dated Jan. 11, 2012, Country: CN, Inventors: Wen Qian, one page.

English translation of abstract only of Chinese application CN102436507 A, Title: Method and device for browsing web pages, Publication dated May 2, 2012, Country: CN, Inventors: Jinwei Li; Zhi Chen, one page.

Reis, Charles and Gribble, Steven D., Isolating Web Programs in Modern Browser Architectures, EuroSys '09 Proceedings of the 4th ACM European conference on Computer systems, Nuremberg, Germany, Apr. 1-3, 2009, pp. 219-232.

* cited by examiner

METHOD AND DEVICE FOR PROVIDING WEBPAGE BROWSING BASED ON WEB BROWSER ENGINE KERNEL

FIELD OF THE INVENTION

The invention relates to webpage technologies, and in particular, to a method and device for providing webpage browsing based on WEBKIT kernel.

BACKGROUND OF THE INVENTION

Webpage browser is an application software for accessing the internet and obtaining information, and has been widely used in the world. With the progress and development of technologies, more and more other types of software, for example, instant messaging software, downloading software, and even an input method software, etc., begin to implement some functions of their software with the aid of and by using the webpage accessing capability of a webpage browser, and provide a better user experience.

The present implementations mostly use a Webbrowser object provided by the MICROSOFT, and access a webpage by implementing a Webbrowser COM object in a process to realize relevant functions.

Such a technical implementation has the following drawbacks, for example:

Webbrowser is a browser control with poor security and will easily induce security issues.

SUMMARY OF THE INVENTION

In view of the above problems, the invention is proposed to provide a method for providing webpage browsing based on a WEBKIT kernel and a corresponding device for providing webpage browsing based on a WEBKIT kernel which overcome the above problems or at least in part solve or mitigate the above problems.

According to an aspect of the invention, there is provided a method for providing webpage browsing based on a WEBKIT kernel comprising: setting a page object exporting interface of the WEBKIT kernel; starting the WEBKIT kernel in a first independent process; invoking the page object exporting interface to create a WEBKIT kernel based page object in a second independent process; and invoking a WEBKIT kernel in the first independent process via the page object to conduct a page browsing operation and page content loading based on the WEBKIT kernel.

According to another aspect of the invention, there is provided a device for providing webpage browsing based on a WEBKIT kernel comprising: an interface exporting module configured to set a page object exporting interface of the WEBKIT kernel; a kernel starting module configured to start the WEBKIT kernel in a first independent process; a first invoking module configured to invoke the page object exporting interface to create a WEBKIT kernel based page object in a second independent process; and a second invoking module configured to invoke a WEBKIT kernel in the first independent process via the page object to conduct a page browsing operation and page content loading based on the WEBKIT kernel.

According to yet another aspect of the invention, there is provided a computer program comprising a computer readable code which causes a server to perform the method for providing webpage browsing based on a WEBKIT kernel, when said computer readable code is running on the server.

According to still another aspect of the invention, there is provided a computer readable medium storing the computer program.

The beneficial effects of the invention lie in that:

The present application proposes a method for realizing webpage browsing by using the WEBKIT kernel across processes, and can well solve the problems that in a browser the version of the Webbrowser kernel lags, the security thereof is poor, and it does not support a non-MICROSOFT platform, as well as the problems of a high technical threshold, difficult upgrade, an oversized installation package, etc. resulting from directly using the WEBKIT kernel.

First, the application exports an interface of a WebAppTabWrapper object for the WEBKIT kernel. After obtaining the WebAppTabWrapper object, third-party software informs a WEBKIT browser to create a new page by invoking the Create method of the object. Specific work performed in webpage browsing, such as an http request, parsing returned data, executing JAVASCRIPT, establishing a Document Object Model (DOM) tree, finishing the final rendering, etc., is invisible to the third-party software, and simplifies the difficulty in using the technologies of the third-party software. The third-party software and actual page accessing, parsing, rendering modules work in different processes, and an isolation between the processes well protects the third-party software from being affected by page insecure factors. Therefore, this application can well solve the problems that the security is poor and user security issues will be easily brought about, which problems result from using the Webbrowser kernel in a browser.

Second, the upgrade and the bug fixing, etc. of the WEBKIT kernel are accomplished by the upgrade & check function of a dll service. When a new version is upgraded and installed, the operation and use of the old version will not be affected, and it is completely invisible to the third-party software. The third-party software obtains the dll path of a new service version by accessing a certain entry in the registry, and uses it after loading it. Furthermore, the new and old versions may be used simultaneously. Therefore, this application may well solve the problem that the version of the Webbrowser kernel lags in a browser.

Moreover, this application may simplify the difficulty in development of third-party software using webpage browsing and increasing software functions in a windows platform and a non-windows platform, such that any third-party software may use a webpage accessing service provided by the invention to easily access a page and enhance the experience of a user of the software.

Of course, any product implementing this application does not necessarily need to attain all the advantages described above simultaneously.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments.

Nowadays, more and more other types of third-party software, for example, instant messaging software, downloading software, and even an input method software, etc., begin to implement some functions of their software with the aid of and by using the webpage accessing capability of a webpage browser, and provide a better user experience.

There are many drawbacks in the Webbrowser object provided by the INTERNET EXPLORER browser of MICROSOFT, for example:

the version of the Webbrowser object is too old, and limits the use and presentation of many new page technologies;

Webbrowser is a browser kernel with poor security, and easily induces security issues;

Webbrowser is easily installed a plug-in and injected a code by various malware, which gives rise to a lot of usage problems, for example, closing the operations of FLASH and JAVA, leading to a failure of relevant functions.

In the course of the third-party software realizing webpage browsing, to solve the above various problems existing in the Webbrowser kernel of INTERNET EXPLORER, the present invention provides a method for realizing webpage browsing by using a WEBKIT. Therein, the WEBKIT is the kernel of a CHROME browser, and the WEBKIT is a web browser engine with open source codes.

However, if in the third-party software the WEBKIT kernel is directly used to realize webpage browsing, the following drawbacks exist:

The interface of the WEBKIT kernel is complex, and its technical threshold is high, which increases the technical threshold for software to utilize it to realize the function of page browsing; the codes of the WEBKIT kernel are many, and its dll (dynamic link library) is relatively large, which increases the volume of software using it; and the version of a browser is updated rapidly, direct inclusion of the WEBKIT kernel cannot achieve rapid use of the up-to-date technologies and avoid known security issues.

Based on this, the present invention does not directly use the WEBKIT, but provides a page browsing service dll across processes, and any third-party software may get the page browsing capability on a system installing such a dll service, which thereby simplifies the technical threshold and complexity of using the WEBKIT to render a page.

As a complete browser kernel, the WEBKIT is only responsible for doing the work of html parsing and rendering, other work like network connection requesting, JAVASCRIPT parsing, peripheral packing, etc. needs to be implemented by the third-party software, and thereafter the WEBKIT can operate normally. However, for realizing a good http protocol stack and a JAVASCRIPT parser, the difficulty is great, and the work is complex.

Such a dll service for page browsing in the present invention may be understood as a proxy, and the proxy encapsulates the work such as network connection request, JAVASCRIPT parsing, peripheral packing, etc., thereby shielding these portions which a user does not care about and yet are complex from the user; and what's more, the proxy also encapsulates simple interfaces to invoke several basic operations of a WEBKIT browser. The third-party software may carry out communication with the WEBKIT kernel via such a dll service, and the user only needs to present a url and a window handle for carrying a page and may obtain a webpage with rendering finished. Since much work in a webpage browsing procedure is accomplished by the dll service, the development of the third-part software is simplified.

In the following, a flow of implementation of the method of the present invention is described in detail by way of an embodiment.

Figure 1:
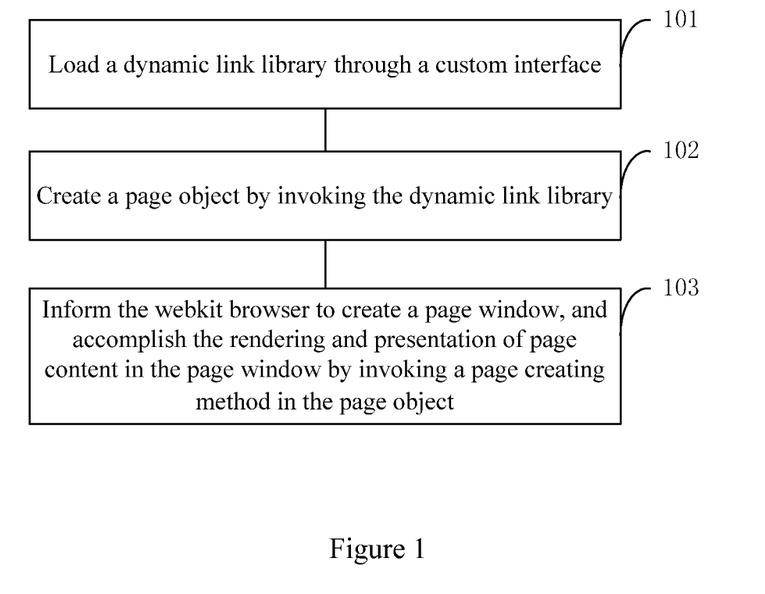
FIG. 1 is a flow chart of a method for webpage browsing across processes based on a WEBKIT kernel according to an embodiment of this application.

Reference is made to FIG. 1, which is a flow chart of a method for webpage browsing across processes based on a WEBKIT kernel as described in an embodiment of this application.

In step 101, a dynamic link library is loaded through a custom interface.

The custom interface comprises an external interface and an internal interface, and the dynamic link library may be loaded through the external interface.

What is provided by the dynamic link library (dll service) to third-party software to be used is an external interface, and after the third-party software implements these simple external interfaces, it can communicate with the dynamic link library.

The dynamic link library also provides a page object exporting interface of the WEBKIT kernel. These internal interfaces are interfaces exported by the WEBKIT kernel and similar to a Webbrowser object of INTERNET EXPLORER, but the specific number of interfaces and the complexity of use are significantly lower than those of the Webbrowser of INTERNET EXPLORER. What's more, for packing the WEBKIT, a traditional method needs to realize several hundreds of interfaces, however, the number of interfaces which need to be realized by the third-party software in the embodiment of the present invention is very little, but several basic browser operations are already included therein.

After realizing the custom interfaces of less number, the third-party software loads a dynamic link library dll via a custom interface, and a particular loading method is as follows:

accessing a registry via the custom interface;

searching the registry for the storage path of the dynamic link library dll; and loading the dynamic link library dll from the storage path.

In step 102, a page object is created by invoking the dynamic link library.

Communication with the WEBKIT kernel may be realized by invoking an internal interface provided by the dynamic link library.

Therein, the page object is created by using a factory mode. The factory mode is one which is specially responsible for instantiating a lot of classes having common interfaces and in which it is unnecessary to know in advance which class to be instantiated each time. It defines an interface for creating an object, and it is up to a sub-class to decide which class to be instantiated.

The particular sub-steps are as follows:

sub-step 1, invoking the dynamic link library to obtain a factory method;

sub-step 2, invoking the factory method to create a factory object; and sub-step 3, invoking the factory object to create the page object.

In step 103, by invoking a page creating method in the page object, the WEBKIT browser is informed to create a page window, and accomplish the rendering and presentation of page content in the page window.

The particular sub-steps are as follows:

sub-step 1, constructing a parameter object, and filling in the parameter object with a website and a window handle for target accessing;

sub-step 2, passing the filled parameter object as a parameter value to the page creating method in the page object; and sub-step 3, by invoking the page creating method assigned with the parameter, the WEBKIT browser is informed to create the page window and accomplish the rendering and presentation of page content in the page window.

In the page object is provided the page creating method, in the method there is provided with a parameter, and after the parameter is assigned as website and window handle for target accessing, communication with the WEBKIT kernel may be conducted by invoking the method, the parameter value is passed to the WEBKIT kernel, the WEBKIT kernel accesses the target website according to the parameter value, and creates the page window, and accomplishes the rendering and presentation of page content in the page window.

Finally, the third-party software may further be informed of relevant callbacks of the browser through corresponding function calls.

In the following, the above content will be explained in detail by way of a specific example.

The content and usage of an interface are as follows.

A factory method is provided for being invoked by the third-party software:

```
extern "C" {
    DLL_INTERFACE WebAppFactory * GetWebAppFactory( );
};
```

The third-party software may load the dll service (dynamic link library) via a function LoadLibrary, obtain a factory method GetWebAppFactory via a function GetProcAddress, create a factory object WebAppFactory, and then get a page object WebAppTabWrapper, of which the interface is as follows:

```
class WebAppTabWrapper {
public:
    virtual HRESULT STDMETHODCALLTYPE
Create(WebAppCreateParams const &) = 0;
    virtual HRESULT STDMETHODCALLTYPE Destroy( ) = 0;
    virtual HRESULT STDMETHODCALLTYPE
    Navigate(char const *) =
0;
    virtual HRESULT STDMETHODCALLTYPE Reposition(
        WebAppRepositionParams const &) = 0;
    virtual HRESULT STDMETHODCALLTYPE Stop( void) = 0;
    virtual HRESULT STDMETHODCALLTYPE Reload( void) =
0;
    virtual HRESULT STDMETHODCALLTYPE GoBack( void) =
0;
    virtual HRESULT STDMETHODCALLTYPE
    GoForward( void) = 0;
    virtual ~WebAppTabWrapper( ) { }
};
```

After obtaining the object WebAppTabWrapper, the third-party software informs a webpage browsing service of the WEBKIT kernel to create a new page by invoking a Create method provided by the object, and invokes a Navigate method to inform the service to perform a navigation operation, and Stop, Reload, GoBack, and GoForward provide basic functions of going forward and backward, stopping loading, and refreshing of a page. When the third-party software does not need to browse a page any more, it destroys the page object by invoking a Destroy method.

In particular, the following steps may be further included:

The WEBKIT browser is informed to conduct the operation of page jumping in the page window by invoking the Navigate method in the page object. For example, in a newly created page window, the content of a welcome page is displayed when accessing a target website initially, and then by invoking the Navigate method, it may jump from the welcome page to the actual home page, however, a new page window will not be created any more, and the jump of page content is only conducted in one and the same page window.

The WEBKIT browser is informed to stop rendering and presenting of page content in the page window by invoking the Stop method in the page object.

The WEBKIT browser is informed to refresh the page content in the page window by invoking the Reload method in the page object.

The WEBKIT browser is informed to conduct the operation of page going backward in the page window by invoking the GoBack method in the page object.

The WEBKIT browser is informed to conduct the operation of page going forward in the page window by invoking the GoForward method in the page object. The WEBKIT browser is informed to destroy the page object by invoking the Destroy method in the page object.

When the third-party software realizes the above interface, the third-party software will be informed of the relevant callbacks of the WEBKIT browser via corresponding function calls. The specific workflow is as shown in FIG. 2.

Figure 2:
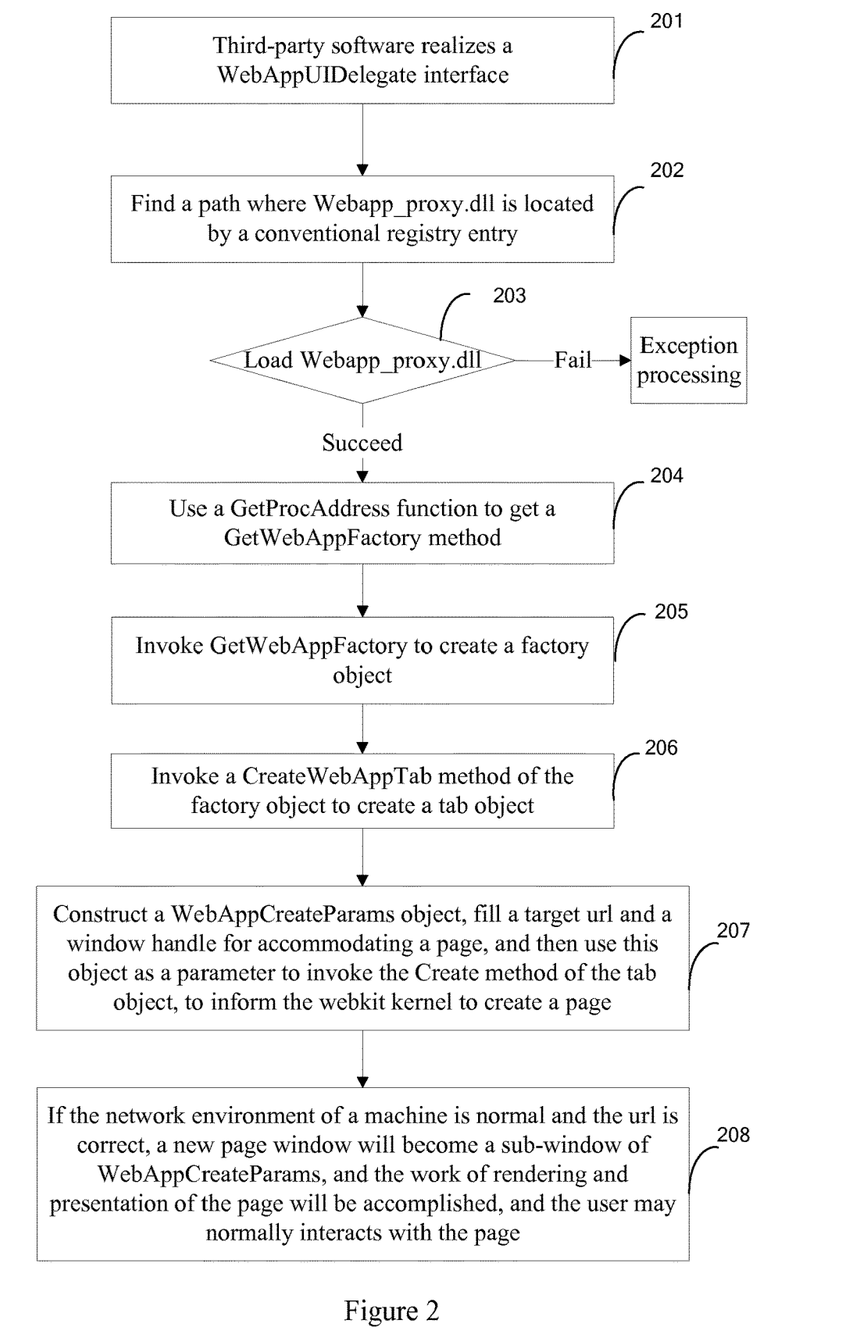
FIG. 2 is a flow chart of a method for webpage browsing across processes based on a WEBKIT kernel according to another embodiment of this application.

Reference is made to FIG. 2, which is a flow chart of a method for webpage browsing across processes based on a WEBKIT kernel as described in another embodiment of this application.

In step 201, third-party software realizes a WebAppUIDelegate interface. The WebAppUIDelegate interface is an external interface provided by the dll service to the third-party software for use. As a preferred embodiment, the interface particularly provides the following interface functions:

```
class WebAppUIDelegate {
public:
    virtual void OnHandleAccelerator( ) = 0;
    virtual void OnOpenURL( ) = 0;
    virtual void OnTitleChange( ) = 0;
    virtual void OnStatusTextChange( ) = 0;
    virtual void OnNavigateComplete2( ) = 0;
    virtual void OnNavigateError( ) = 0;
    virtual void OnQuit( ) = 0;
    virtual void OnUpdateTargetUrl( ) = 0;
    virtual void OnGetCurrentUrlRsp( ) = 0;
    virtual void OnCrashReport( ) = 0;
    virtual void OnReportMainWindow( ) = 0;
    virtual void OnWebAppJsCall( ) = 0;
};
```

The description of individual interface functions is as follows:

the OnHandleAccelerator function provides a shortcut callback method, to inform the third-party software that a user has pressed a set of shortcuts;

the OnOpenURL function provides a callback method for page opening, to inform the third-party software that a user tries to open a new page, and the third-party software may enable or disable it;

the OnTitleChange function provides a callback method for title changing, to inform the third-party software that the text of the title of the current window has been changed;

the OnStatusTextChange function provides a callback method for status bar changing, to inform the third-party software that the text of the status bar of the current window has been changed;

the OnNavigateComplete2 function provides a navigation completion callback method, to inform the third-party software that the navigation is completed;

the OnNavigateError function provides a navigation error callback method, to inform the third-party software that the navigation is erroneous;

the OnQuit function provides a quit callback method, to inform the third-party software that a user has closed the current page or the rendering service has quitted for some reason;

the OnUpdateTargetUrl function provides a callback method for target url updating, to inform the third-party software that the current target url has been changed;

the OnGetCurrentUrlRsp function provides a callback method for getting the current url, to inform the third-party software of the current url;

the OnCrashReport function provides a crash callback method, to inform the third-party software that the page accessing service has crashed;

the OnReportMainWindow function provides a main window callback method, to inform the third-party software of the main window of the current page; and the OnWebAppJsCall function provides a JAVASCRIPT callback method, to inform the third-party software that the page requests to execute an external JAVASCRIPT call.

In step 202, a path where Webapp_proxy.dll is located is found by a conventional registry entry.

Therein, the Webapp_proxy.dll is a dynamic link library, i.e., a dll service.

In step 203, the Webapp_proxy.dll is loaded.

If the loading is successful, it proceeds to step 204; if the loading fails, then it goes to the exception handling.

In step 204, a GetProcAddress function is used to get a GetWebAppFactory method.

Therein, the GetWebAppFactory method is a factory method.

In step 205, the GetWebAppFactory method is invoked to create a factory object.

The created factory object is WebAppFactory.

In step 206, a CreateWebAppTab method of the factory object is invoked to create a tab object.

Therein, the tab object is WebAppTabWrapper.

In step 207, a WebAppCreateParams object is constructed, a target url and a window handle for accommodating a page are filled therein, and then this object is used as a parameter to invoke the Create method of the tab object, to inform the WEBKIT kernel to create a page.

Therein, the WebAppCreateParams object is a parameter object;

the WEBKIT kernel creates a new page window according to the target url and the window handle, and accomplishes the rendering and presentation of the page.

In step 208, if the network environment of a machine is normal and the url is correct, a new page window will become a sub-window of WebAppCreateParams, and the work of rendering and presentation of the page will be accomplished, and the user may normally interacts with the page.

Based on the flow of FIG. 2, multiple pieces of third-party software may load such an interface dll simultaneously, accomplish page browsing, and they will not affect each other and are invisible to each other. The upgrade and the bug fixing, etc. of the WEBKIT kernel are accomplished by the upgrade & check function of a dll service. When a new version is upgraded and installed, the operation and use of the old version will not be affected, and it is completely invisible to the third-party software. The third-party software obtains the dll path of a new service version by accessing a certain entry in the registry, and uses it after loading it. Furthermore, the new and old versions may be used simultaneously.

To sum up, the embodiment of the application exports an interface of a WebAppTabWrapper object for the WEBKIT kernel. After obtaining the WebAppTabWrapper object, third-party software informs a WEBKIT browser to create a new page by invoking the Create method of the object. Specific work performed in webpage browsing, such as an http request, parsing returned data, executing JAVASCRIPT, establishing a DOM tree, finishing the final rendering, etc., is invisible to the third-party software, and simplifies the difficulty in using the technologies of the third-party software. The third-party software and actual page accessing, parsing, rendering modules work in different processes, namely, access across processes is realized, and an isolation between the processes well protects the third-party software from being affected by page insecure factors.

Therein, the "isolation between the processes" comprises two meanings:

first, the dll service and the WEBKIT kernel are isolated from each other, and work in different processes respectively;

second, pieces of third-party software are isolated from each other, each piece of third-party software may independently load the dll service to accomplish page browsing, and they do not interfere with each other.

Moreover, the webpage accessing service based on a WEBKIT kernel is not limited to a version of the windows operating system of the MICROSOFT and the operating system itself, and can also work in a way similar to the above in a non-windows platform, which simplifies the difficulty in development of the third-party software across platforms and versions.

In short, the present invention proposes a method for realizing webpage browsing by using the WEBKIT kernel across processes, and can well solve the problems that in INTERNET EXPLORER the version of the Webbrowser kernel lags, the security thereof is poor, and it does not support a non-MICROSOFT platform, as well as the problems of a high technical threshold, difficult upgrade, an oversized installation package, etc. resulting from directly using the WEBKIT kernel.

Moreover, this application may simplify the difficulty in development of third-party software using webpage browsing and increasing software functions in a windows platform and a non-windows platform, such that any third-party software may use a webpage accessing service provided by the invention to easily access a page and enhance the experience of a user of the software.

It needs to be noted that, for the foregoing method embodiment, to describe it simply, it is expressed as a combination of a series of actions. However, it should be known to those skilled in the art that this application is not restricted by the order of the described actions, since according to this application, some steps may adopt other order or be performed simultaneously. Secondly, it should also be known to those skilled in the art that the embodiments described in the specification all pertain to preferred embodiments, and the involved actions are not necessarily essential to this application.

Based on the description of the above method embodiment, this application further provides a corresponding embodiment of a device for webpage browsing.

Figure 3:
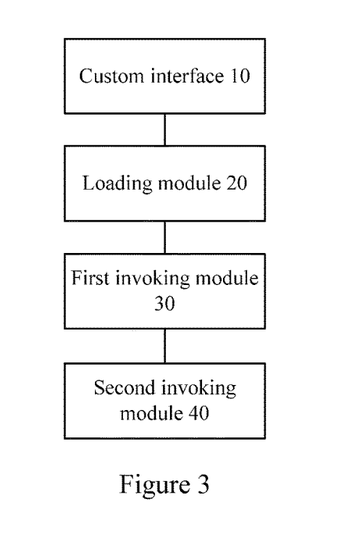
FIG. 3 is a structural diagram of a device for webpage browsing across processes based on a WEBKIT kernel according to an embodiment of this application.

Reference is made to FIG. 3, which is a structural diagram of a device for webpage browsing across processes based on a WEBKIT kernel as described in an embodiment of this application.

The device for webpage browsing may comprise the following interfaces and modules:

a custom interface 10 and a loading module 20, which loading module 20 loads a dynamic link library through the custom interface 10;

a first invoking module 30 configured to create a page object by invoking the dynamic link library;

a second invoking module 40 configured to inform the WEBKIT browser to create a page window, and accomplish the rendering and presentation of page content in the page window by invoking a page creating method in the page object.

Therein, the first invoking module 30 may particularly comprise the following sub-modules:

a factory method obtaining sub-module configured to invoke the dynamic link library to obtain a factory method;

a factory object creating sub-module configured to invoke the factory method to create a factory object; and a page object creating sub-module configured to invoke the factory object to create the page object.

Therein, the second invoking module 40 may particularly comprise the following sub-modules:

a constructing sub-module configured to construct a parameter object, and fill in the parameter object with website and window handle for target accessing;

a parameter assignment sub-module configured to pass the filled parameter object as a parameter value to the page creating method in the page object; and a page creating sub-module configured to inform the WEBKIT browser to create the page window and accomplish the rendering and presentation of page content in the page window by invoking the page creating method assigned with the parameter.

Therein, the loading module 20 may particularly comprise the following sub-modules:

a registry accessing sub-module configured to access a registry via the custom interface;

a path searching sub-module configured to search the registry for the storage path of the dynamic link library; and a loading sub-module configured to load the dynamic link library from the storage path.

Figure 4:
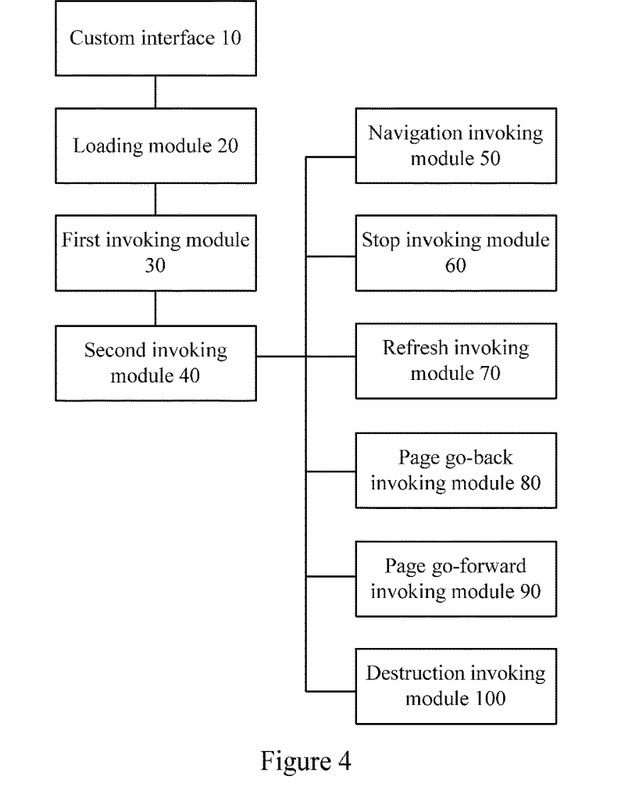
FIG. 4 is a structural diagram of a device for webpage browsing across processes based on a WEBKIT kernel according to another embodiment of this application.

In another embodiment, as shown in FIG. 4, preferably, the device may further comprise:

a navigation invoking module 50 configured to inform the WEBKIT browser to conduct the operation of page jumping in the page window by invoking the Navigate method in the page object.

Preferably, the device may further comprise:

a stop invoking module 60 configured to inform the WEBKIT browser to stop rendering and presenting of page content in the page window by invoking the Stop method in the page object.

Preferably, the device may further comprise:

a refresh invoking module 70 configured to inform the WEBKIT browser to refresh the page content in the page window by invoking the Reload method in the page object.

Preferably, the device may further comprise:

a page go-back invoking module 80 configured to inform the WEBKIT browser to conduct the operation of page going backward in the page window by invoking the GoBack method in the page object; and a page go-forward invoking module 90 configured to inform the WEBKIT browser to conduct the operation of page going forward in the page window by invoking the GoForward method in the page object.

Preferably, the device may further comprise:

a destruction invoking module 100 configured to inform the WEBKIT browser to destroy the page object by invoking the Destroy method in the page object.

For the embodiments of the device for webpage browsing as shown above in FIG. 3 and FIG. 4, their description is relatively simple due to they being substantially similar to the method embodiments, and what is relevant may be referred to the description for parts of the method embodiments as shown in FIG. 1 and FIG. 2.

Based on the above content, this application further provides embodiments of another method and device for providing webpage browsing based on a WEBKIT kernel, which will be described in the following by means of FIG. 5 and FIG. 6, respectively.

Figure 5:
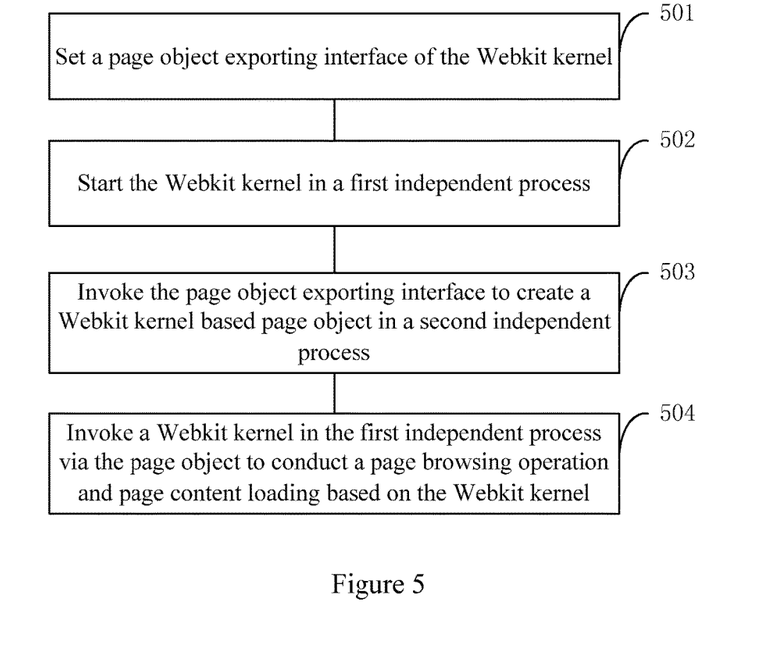
FIG. 5 is a flow chart of a method for webpage browsing across processes based on a WEBKIT kernel according to a further embodiment of this application.

Reference is made to FIG. 5, which is a flow chart of a method for webpage browsing across processes based on a WEBKIT kernel as described in a further embodiment of this application.

In step 501, a page object exporting interface of the WEBKIT kernel is set.

In step 502, the WEBKIT kernel is started in a first independent process.

In step 503, the page object exporting interface is invoked to create a WEBKIT kernel based page object in a second independent process.

The first dependent process and the second independent process are two processes, in other words, the browsing of a page and the operation of the WEBKIT kernel are independent of each other and do not affect each other.

In particular, invoking the page object exporting interface to create a WEBKIT kernel based page object may comprise the following sub-steps:

sub-step 1, obtaining a factory method provided by the page object exporting interface;

sub-step 2, invoking the factory method to create a factory object; and sub-step 3, invoking the factory object to create the WEBKIT kernel based page object.

In step 504, a WEBKIT kernel in the first independent process is invoked via the page object to conduct a page browsing operation and page content loading based on the WEBKIT kernel.

The second independent process may realize communication with the WEBKIT kernel in the first dependent process by invoking the page object, and in particular, the invoking a WEBKIT kernel in the first independent process via the page object may comprise the following sub-steps:

sub-step 1, constructing a parameter object, and filling in the parameter object with website and window handle for target accessing;

sub-step 2, passing the filled parameter object as a parameter value to the page creating method provided by the page object; and sub-step 3, by invoking the page creating method assigned with the parameter, realizing communication with the WEBKIT kernel in the independent process.

The second independent process may realize the operation of page browsing and the page content loading by invoking the WEBKIT kernel. In the following, the particular procedure of page content loading and which operations of page browsing there are will be described in detail, respectively.

1. Page Content Loading

In particular, the invoking a WEBKIT kernel in the first independent process via the page object to conduct the page content loading based on the WEBKIT kernel may particularly comprise the following processing:

invoking the WEBKIT kernel in the first independent process to create a page window by the page creating method provided by the page object; and conducting page content loading based on the WEBKIT kernel in the page window.

Further, the page content loading is conducted in the second independent process;

and the loading comprises the following processing steps:

1) obtaining page content according to a received http request;

2) parsing the obtained page content;

3) performing a JAVASCRIPT operation on the parsed result;

4) establishing a DOM tree according to the result of the JAVASCRIPT operation;

5) rendering and presenting the DOM tree.

2. The Operation of Page Browsing

The operation of page browsing may comprise:

page jumping, and/or page window moving, and/or stopping loading of a page, and/or page refreshing, and/or going forward, backward of a page, and/or page destroying.

Further, for the page jumping operation, the WEBKIT kernel in the independent process may be invoked to conduct the page jumping operation in the page window by the Navigate method provided by the page object;

for the page window moving operation, the WEBKIT kernel in the independent process may be invoked to inform the page window to move following the movement of an external window by the Reposition method provided by the page object;

for the operation of stopping loading of a page, the WEBKIT kernel in the independent process may be invoked to stop loading page content in the page window by the Stop method provided by the page object;

for the page refreshing operation, the WEBKIT kernel in the independent process may be invoked to refresh the page content in the page window by the Reload method provided by the page object;

for the page go-back operation, the WEBKIT kernel in the independent process may be invoked to conduct the operation of page going backward in the page window by the GoBack method provided by the page object;

for the page go-forward operation, the WEBKIT kernel in the independent process may be invoked to conduct the operation of page going forward in the page window by the GoForward method provided by the page object;

for the page destroying operation, the WEBKIT kernel in the independent process may be invoked to destroy the page object by the Destroy method provided by the page object.

Based on the content of the embodiment of FIG. 5, preferably, a page object exporting interface of the WEBKIT kernel may be provided by a dynamic link library (dll service), which exporting interface is an internal interface provided by the dynamic link library for communication with the WEBKIT kernel. Further, the dynamic link library further provides an external interface for communication with third-party software.

Further, before the second independent process invokes the page object exporting interface to create a page object, the following processing may be further included:

accessing a registry and searching the registry for a storage path of the dynamic link library; and loading the dynamic link library from the storage path.

Preferably, the following processing may be further included:

after the WEBKIT kernel is upgraded, updating the version of the dynamic link library, and saving the dynamic link library of the new version in a storage path different from that of the old version.

Moreover, a plurality of second independent processes may load the same dynamic link library from the same storage path.

Namely, when a new version is upgraded and installed, the operation and use of the old version will not be affected, the new and old versions may be used simultaneously, and it is completely invisible to the third-party software. What's more, multiple pieces of third-part software may realize webpage browsing based on a WEBKIT kernel simultaneously.

Figure 6:
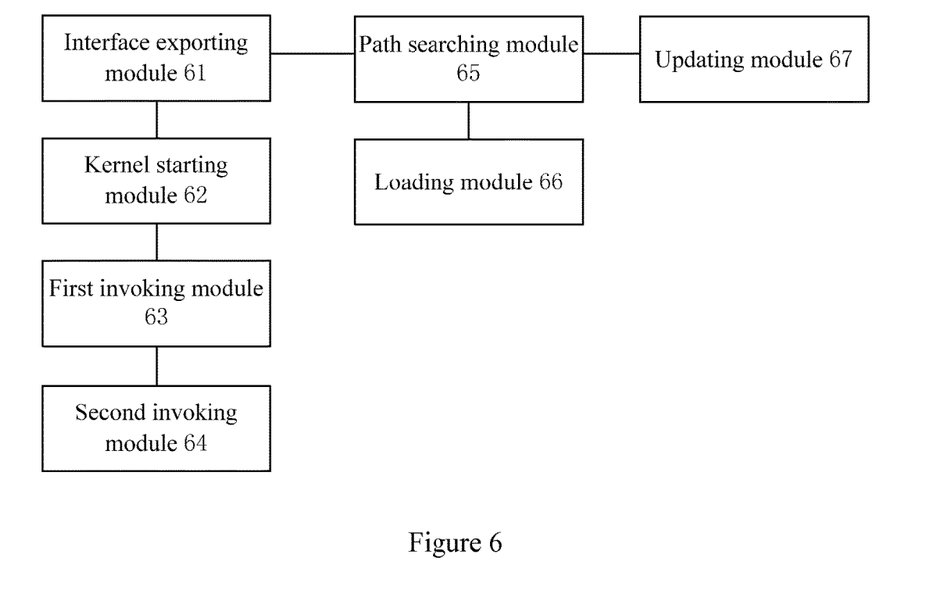
FIG. 6 is a structural diagram of a device for webpage browsing across processes based on a WEBKIT kernel according to a further embodiment of this application.

Reference is made to FIG. 6, which is a structural diagram of a device for webpage browsing across processes based on a WEBKIT kernel as described in a further embodiment of this application.

In particular, the device for providing webpage browsing based on a WEBKIT kernel may comprise the following modules:

an interface exporting module 61 configured to set a page object exporting interface of the WEBKIT kernel;

a kernel starting module 62 configured to start the WEBKIT kernel in a first independent process;

a first invoking module 63 configured to invoke the page object exporting interface to create a WEBKIT kernel based page object in a second independent process; and a second invoking module 64 configured to invoke a WEBKIT kernel in the first independent process via the page object to conduct a page browsing operation and page content loading based on the WEBKIT kernel.

Preferably, the first invoking module 63 may particularly comprise:

a factory method obtaining sub-module configured to obtain a factory method provided by the page object exporting interface;

a factory object creating sub-module configured to invoke the factory method to create a factory object; and a page object creating sub-module configured to invoke the factory object to create the WEBKIT kernel based page object.

Preferably, the second invoking module 64 may invoke the WEBKIT kernel in the first independent process to create a page window and conduct page content loading based on the WEBKIT kernel in the page window by a page creating method provided by the page object.

Preferably, the page content loading is conducted in the second independent process.

The loading comprises:

obtaining page content according to a received http request;

parsing the obtained page content;

performing a JAVASCRIPT operation on the parsed result;

establishing a DOM tree according to the result of the JAVASCRIPT operation;

rendering and presenting the DOM tree.

Preferably, the page browsing operation comprises:

page jumping, and/or page window moving, and/or stopping loading of a page, and/or page refreshing, and/or going forward, backward of a page, and/or page destroying.

Preferably, the second invoking module 64 may particularly comprise:

a navigation invoking sub-module configured to invoke the WEBKIT kernel in the independent process to conduct the page jumping operation in the page window by the Navigate method provided by the page object;

and/or a move invoking sub-module configured to invoke the WEBKIT kernel in the independent process to inform the page window to move following the movement of an external window by the Reposition method provided by the page object;

and/or a stop invoking sub-module configured to invoke the WEBKIT kernel in the independent process to stop loading page content in the page window by the Stop method provided by the page object;

and/or a refresh invoking sub-module configured to invoke the WEBKIT kernel in the independent process to refresh the page content in the page window by the Reload method provided by the page object;

and/or a page go-back invoking sub-module configured to invoke the WEBKIT kernel in the independent process to conduct the operation of page going backward in the page window by the GoBack method provided by the page object;

and/or a page go-forward invoking sub-module configured to invoke the WEBKIT kernel in the independent process to conduct the operation of page going forward in the page window by the GoForward method provided by the page object;

and/or a destruction invoking sub-module configured to invoke the WEBKIT kernel in the independent process to destroy the page object by the Destroy method provided by the page object.

Preferably, the second invoking module 64 may further comprise:

a constructing sub-module configured to construct a parameter object, and fill in the parameter object with website and window handle for target accessing;

a parameter assignment sub-module configured to pass the filled parameter object as a parameter value to the page creating method provided by the page object; and a page creating sub-module configured to realize communication with the WEBKIT kernel in the independent process by invoking the page creating method assigned with the parameter.

Preferably, the interface exporting module 61 may provide the page object exporting interface of the WEBKIT kernel through the dynamic link library.

Preferably, the device may further comprise:

a path searching module 65 configured to access a registry and search the registry for a storage path of the dynamic link library; and a loading module 66 configured to load the dynamic link library from the storage path.

Preferably, the device may further comprise:

an updating module 67 configured to, after the WEBKIT kernel is upgraded, update the version of the dynamic link library, and save the dynamic link library of the new version in a storage path different from that of the old version.

Preferably, a plurality of second independent processes load the same dynamic link library from the same storage path.

For the embodiment of the device for webpage browsing as shown above in FIG. 6, it is described relatively simply due to it being basically similar to the method embodiment, and as for its relevant parts reference may be made to the parts of the method embodiment as shown in FIG. 5.

Various embodiments in the specification are described using a progressive manner, each embodiment highlights its difference from other embodiments, and identical or similar parts of various embodiments may be referred relative to each other.

The embodiments of the application may be embodied in any device (or devices) supporting graphical processing, internet content retrieval and rendering. These devices comprise, but are not limited to, a personal computer, a cluster server, a mobile phone, a working station, an embedded system, a game console, a television, a set-top-box, or any other computing device supporting computer graphics and content display.

Embodiments of the individual components of the invention may be implemented in hardware, or in a software module running on one or more processors, or in a combination thereof. It will be appreciated by those skilled in the art that, in practice, some or all of the functions of some or all of the components in a device for providing webpage browsing based on a WEBKIT kernel according to individual embodiments of the invention may be realized using a microprocessor or a digital signal processor (DSP). The invention may also be implemented as an apparatus or device program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 7:
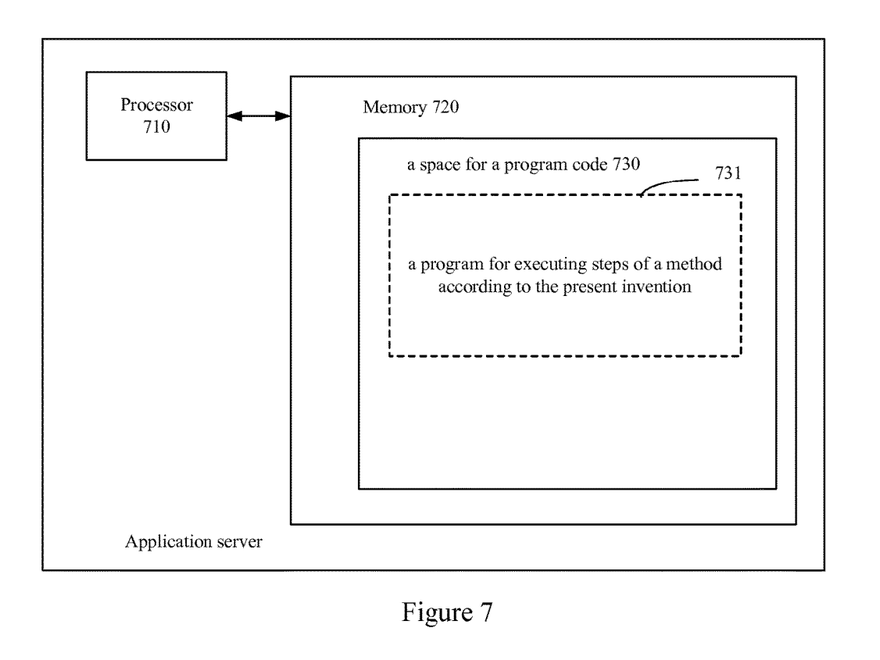
FIG. 7 shows schematically a block diagram of a server for performing a method according to the invention.
Figure 8:
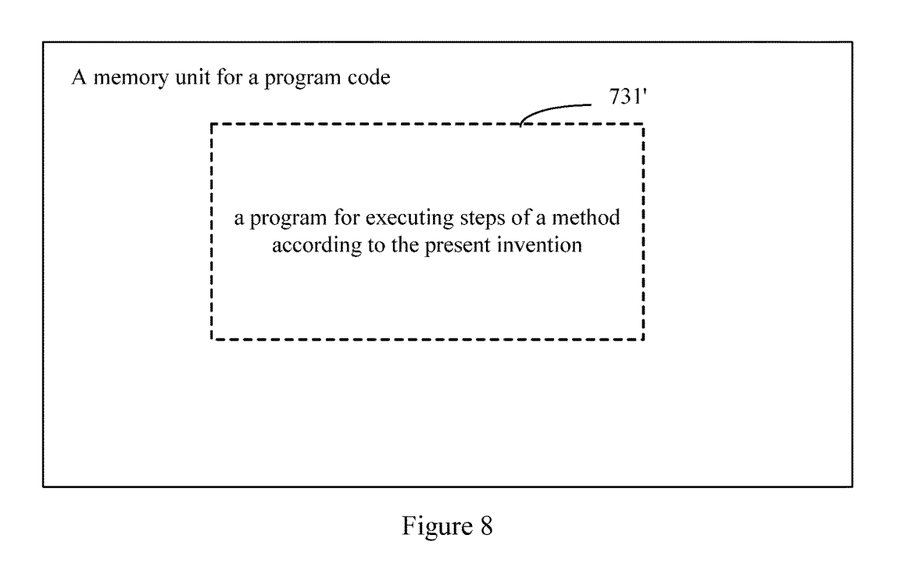
FIG. 8 shows schematically a storage unit for retaining or carrying a program code implementing a method according to the invention.

For example, FIG. 7 shows a server which may carry out a method for providing webpage browsing based on a WEBKIT kernel according to the invention, e.g., an application server. The server traditionally comprises a processor 710 and a computer program product or a computer readable medium in the form of a memory 720. The memory 720 may be an electronic memory such as a flash memory, an EEPROM (electrically erasable programmable read-only memory), an EPROM, a hard disk or a ROM. The memory 720 has a memory space 730 for a program code 731 for carrying out any method steps in the methods as described above. For example, the memory space 730 for a program code may comprise individual program codes 731 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 8. The storage unit may have a memory segment, a memory space, etc. arranged similarly to the memory 720 in the server of FIG. 7. The program code may for example be compressed in an appropriate form. In general, the storage unit comprises a computer readable code 731', i.e., a code which may be read by e.g., a processor such as 710, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A method for providing webpage browsing based on a web browser engine kernel comprising:
    setting, by at least one processor, a page object exporting interface of the web browser engine kernel;
    starting, by the at least one processor, the web browser engine kernel in a first independent process;
    invoking, by the at least one processor, the page object exporting interface to create a web browser engine kernel based page object in a second independent process; and
    invoking, by the at least one processor, the web browser engine kernel in the first independent process via the web browser engine kernel based page object to conduct a page browsing operation and page content loading based on the web browser engine kernel.

2. The method according to claim 1, wherein the invoking the page object exporting interface to create the web browser engine kernel based page object comprises:
    obtaining a factory method provided by the page object exporting interface;
    invoking the factory method to create a factory object; and
    invoking the factory object to create the web browser engine kernel based page object.

3. The method according to claim 1, wherein the invoking the web browser engine kernel in the first independent process via the web browser engine kernel based page object to conduct a page browsing operation and page content loading based on the web browser engine kernel comprises:
    invoking the web browser engine kernel in the first independent process to create a page window by a page creating method provided by the web browser engine kernel based page object; and
    conducting page content loading based on the web browser engine kernel in the page window.

4. The method according to claim 3, wherein the page content loading is conducted in the second independent process, and the page content loading comprises:
    obtaining page content according to a received hypertext transfer protocol (HTTP) request;
    parsing the obtained page content;
    performing a JavaScript operation on the parsed result;
    establishing a Document Object Model (DOM) tree according to the result of the JavaScript operation; and
    rendering and presenting the DOM tree.

5. The method according to claim 3, wherein the page browsing operation comprises:
    page jumping, and/or page window moving, and/or stopping loading of a page, and/or page refreshing, and/or going forward a page, and/or going backward a page, and/or page destroying.

6. The method according to claim 5, wherein the invoking the web browser engine kernel in the first independent process via the web browser engine kernel based page object to conduct the page browsing operation based on the web browser engine kernel comprises at least one of:
    invoking the web browser engine kernel in the first independent process to conduct the page jumping operation in the page window by a Navigate method provided by the web browser engine kernel based page object;
    invoking the web browser engine kernel in the first independent process to inform the page window to move following the movement of an external window by a Reposition method provided by the web browser engine kernel based page object;
    invoking the web browser engine kernel in the first independent process to stop loading page content in the page window by a Stop method provided by the web browser engine kernel based page object;
    invoking the web browser engine kernel in the first independent process to refresh the page content in the page window by a Reload method provided by the web browser engine kernel based page object;

invoking the web browser engine kernel in the first independent process to conduct the operation of going backward in the page window by a GoBack method provided by the web browser engine kernel based page object;

invoking the web browser engine kernel in the first independent process to conduct the operation of going forward in the page window by a GoForward method provided by the web browser engine kernel based page object; and invoking the web browser engine kernel in the first independent process to destroy the web browser engine kernel based page object by a Destroy method provided by the web browser engine kernel based page object.

7. The method according to claim 1, wherein the invoking the web browser engine kernel in the first independent process via the web browser engine kernel based page object comprises:

constructing a parameter object, and filling in the parameter object with a website and window handle for target accessing;

passing the filled parameter object as a parameter value to a page creating method provided by the web browser engine kernel based page object; and realizing communication with the web browser engine kernel in the first independent process by invoking the page creating method assigned with the parameter object.

8. The method according to claim 1, wherein the setting the page object exporting interface of the web browser engine kernel comprises:

providing the page object exporting interface of the web browser engine kernel through a dynamic link library.

9. The method according to claim 8, wherein before invoking the page object exporting interface, the method further comprises:

accessing a registry and searching the registry for a storage path of the dynamic link library; and loading the dynamic link library from the storage path.

10. The method according to claim 9, further comprising:

after the web browser engine kernel is upgraded, updating the version of the dynamic link library, and saving the dynamic link library of a new version in a storage path different from that of the old version.

11. The method according to claim 10, wherein a plurality of second independent processes load the dynamic link library from the same storage path.

12. A device for providing webpage browsing based on a web browser engine kernel comprising:

a memory storing computer readable instructions and at least one processor to execute the instructions to perform operations comprising:

setting a page object exporting interface of the web browser engine kernel;

starting the web browser engine kernel in a first independent process;

invoking the page object exporting interface to create a web browser engine kernel based page object in a second independent process; and invoking the web browser engine kernel in the first independent process via the web browser engine kernel based page object to conduct a page browsing operation and page content loading based on the web browser engine kernel.

13. The device according to claim 12, the operations further comprising:

obtaining a factory method provided by the page object exporting interface;

invoking the factory method to create a factory object; and invoking the factory object to create the web browser engine kernel based page object.

14. The device according to claim 12, the operations further comprising:

invoking the web browser engine kernel in the first independent process to create a page window and conduct page content loading based on the web browser engine kernel in the page window by a page creating method provided by the web browser engine kernel based page object.

15. The device according to claim 14, wherein the page content loading is conducted in the second independent process, and the page content loading comprises:

obtaining page content according to a received hypertext transfer protocol (HTTP) request;

parsing the obtained page content;

performing a JavaScript operation on the parsed result;

establishing a Document Object Model (DOM) tree according to the result of the JavaScript operation; and rendering and presenting the DOM tree.

16. The device according to claim 14, wherein the page browsing operation comprises:

page jumping, and/or page window moving, and/or stopping loading of a page, and/or page refreshing, and/or going forward a page, and/or going backward a page, and/or page destroying.

17. The device according to claim 16, wherein the operations further comprise at least one of:

invoking the web browser engine kernel in the first independent process to conduct the page jumping operation in the page window by a Navigate method provided by the web browser engine kernel based page object;

invoking the web browser engine kernel in the first independent process to inform the page window to move following the movement of an external window by a Reposition method provided by the web browser kernel based page object;

invoking the web browser engine kernel in the first independent process to stop loading page content in the page window by a Stop method provided by the web browser kernel based page object;

invoking the web browser engine kernel in the first independent process to refresh the page content in the page window by a Reload method provided by the web browser kernel based page object;

invoking the web browser engine kernel in the first independent process to conduct the operation of going backward in the page window by a GoBack method provided by the web browser kernel based page object;

invoking the web browser engine kernel in the first independent process to conduct the operation of going forward in the page window by a GoForward method provided by the web browser kernel based page object; and invoking the web browser engine kernel in the first independent process to destroy the web browser kernel based page object by a Destroy method provided by the web browser kernel based page object.

18. The device according to claim 12, the operations further comprising:

constructing a parameter object, and filling in the parameter object with a website and window handle for target accessing;

passing the filled parameter object as a parameter value to a page creating method provided by the web browser kernel based page object; and realizing communication with the web browser engine kernel in the first independent process by invoking the page creating method assigned with the parameter object.

19. The device according to claim 12, the operations further comprising:

providing the page object exporting interface of the web browser engine kernel through the dynamic link library.

20. A non-transitory computer readable medium having instructions stored thereon that, when executed by at least one processor, cause the at least one processor to perform operations for webpage browsing based on a web browser engine kernel comprising:

setting a page object exporting interface of the web browser engine kernel;

starting the web browser engine kernel in a first independent process;

invoking the page object exporting interface to create a web browser engine kernel based page object in a second independent process; and invoking the web browser engine kernel in the first independent process via the web browser kernel engine based page object to conduct a page browsing operation and page content loading based on the web browser engine kernel.

* * * * *